United States Patent [19]

Takeda

[11] Patent Number: 4,547,151

[45] Date of Patent: Oct. 15, 1985

[54] METHOD OF HEAT-TREATING PARTICLES AND APPARATUS THEREFOR

[75] Inventor: Hirro Takeda, Kawasaki, Japan

[73] Assignee: Nippon Oil Co., Ltd., Tokyo, Japan

[21] Appl. No.: 585,199

[22] Filed: Mar. 1, 1984

[30] Foreign Application Priority Data

Mar. 1, 1983 [JP] Japan .................. 58-31791

[51] Int. Cl.$^4$ .................. F27B 15/00; F26B 17/00
[52] U.S. Cl. .................. 432/14; 34/57 A; 432/58
[58] Field of Search .................. 432/14, 15, 58; 34/57 A

[56] References Cited

U.S. PATENT DOCUMENTS 2,533,142  12/1950  Royster .................. 432/14

FOREIGN PATENT DOCUMENTS 847734  9/1960  United Kingdom .................. 34/57 A Primary Examiner—John J. Camby
Attorney, Agent, or Firm—Wenderoth, Lind & Ponack

[57] ABSTRACT

A method of heat-treating particles by contacting within a contacting receptacle particles fed from the top portion of the receptacle with a heated gas introduced from its bottom portion, which comprises (1) moving the particles sequentially from an upper to a lower moving layer portion through a multiplicity of moving layer portions formed by partitioning said contacting receptacle with a plurality of funnel-shaped supporting plates, said movement being effected via porous plates provided in the individual moving layer portions to thereby prevent blocking of the particles, (2) meanwhile causing the heated gas to rise sequentially from the lowermost moving layer portion to upper moving layers to contact it with the particles in each of the moving layer portions, the heated gas being supplied through a gas pipe leading from the gas layer of each moving layer portion to a gas dispersing plate provided in the adjoining upper moving layer portion to disperse the heated gas introduced in each adjoining upper moving layer, and (3) maintaining the temperature of the heated gas introduced into each upper moving layer portion through the gas pipe or elevating or lowering it by a heat exchanger provided in each gas pipe, whereby the heat-treating temperatures for the particles in the individual moving layer portions are maintained at the same point or predetermined different points; and an apparatus therefor.

10 Claims, 9 Drawing Figures

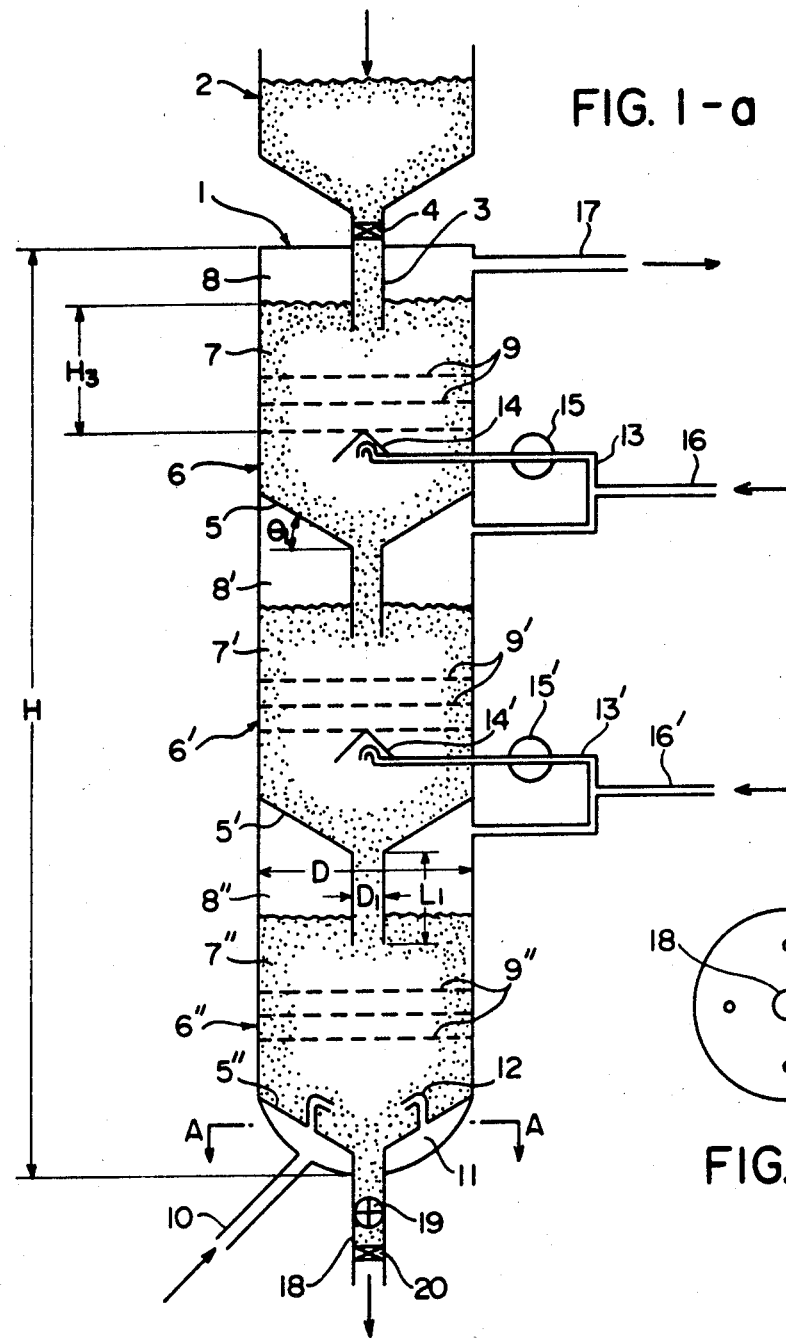
FIG. 1-a
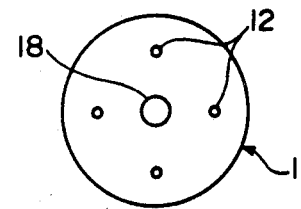
FIG. 1-b

FIG. 2-a
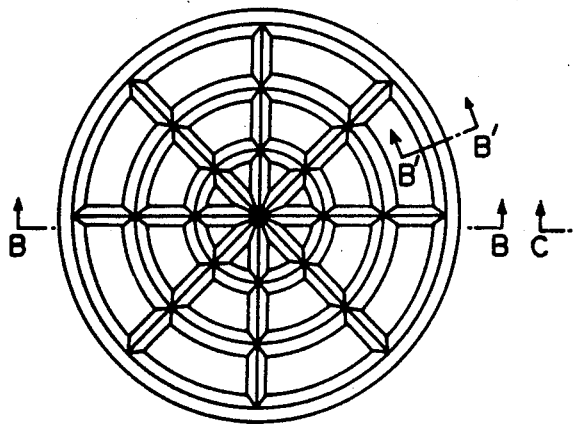
FIG. 3-a
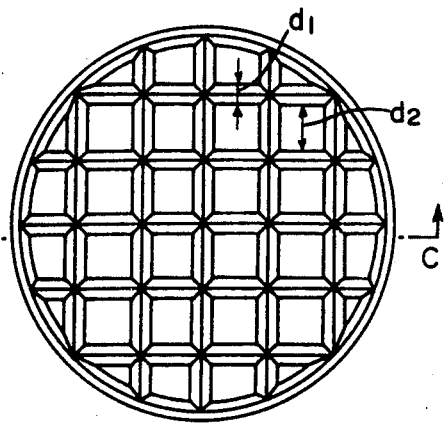
FIG. 2-b
FIG. 3-b
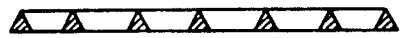
FIG. 2-c
FIG. 4-a
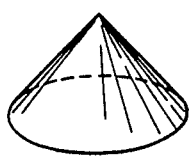
FIG. 4-b
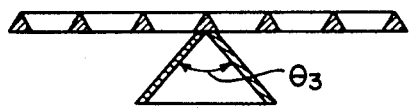

METHOD OF HEAT-TREATING PARTICLES AND APPARATUS THEREFOR

FIELD OF THE INVENTION

This invention relates to a method for heat-treating particles and an apparatus therefor. More specifically, this invention relates to a method of heat-treating particles such as particles of used catalysts or adsorbents, wherein substances which adhere to, or are adsorbed on, the particles and which can be removed by heating (such as carbon, sulfur, water and volatile substances) are removed and available particles are regenerated and recovered.

DESCRIPTION OF THE PRIOR ART

Conventional methods of continuously heating particles in fluidized beds include a direct heating-type method which comprises heating particles by directly contacting a moving layer of the particles with a heated fluid medium such as a heated gas, and an indirect heating-type method which comprises heating particles from outside a moving layer of the particles by means of a heated fluid medium flowing in a jacket, etc. or a heated fluid medium to be introduced into the outside member of a double tube.

The former direct heating method has a high heat transmission efficiency (or a heating efficiency), but its use is limited because of various adverse effects with regard to the moving of the particles within the moving layer. For example, a blocking phenomenon occurs as a result of adhesion of the particles to each other within the moving layer to form agglomerated particles that grow. This naturally hampers the movement of the particles. Or a channeling phenomenon occurs in which a heating medium such as a heated gas locally flows within the moving layer. This phenomenon leads to a failure of uniformly heating the moving layer and to a reduction in heat transmitting efficiency.

The latter indirect heating method is limited in the apparatus used because the heat transmitting area must be increased in order to increase the heat transmitting efficiency. Furthermore, since particles generally has a low available heat conductivity, the heat transmitting efficiency (or the heating efficiency) is poor, and it is difficult to heat the entire moving layer uniformly.

SUMMARY OF THE INVENTION

It is an object of this invention to provide a very simple and effective treating method, which makes the most of the merits of the aforesaid conventional methods and eliminates their shortcomings; and an apparatus for direct use in its practice.

According to this invention, there is provided a method of heat-treating particles by contacting within a contacting receptacle particles fed from the top portion of the receptacle with a heated gas introduced from its bottom portion, which comprises (1) moving the particles sequentially from an upper to a lower moving layer portion through a multiplicity of moving layer portions formed by partitioning said contacting receptacle with a plurality of funnel-shaped supporting plates, said movement being effected via porous plates provided in the individual moving layer portions to thereby prevent blocking of the particles, (2) meanwhile causing the heated gas to rise sequentially from the lowermost moving layer portion to upper moving layers to contact it with the particles in each of the moving layer portions, the heated gas being supplied through a gas pipe leading from the gas layer of each moving layer portion to a gas dispersing plate provided in the adjoining upper moving layer portion to disperse the heated gas introduced in each adjoining upper moving layer, and (3) maintaining the temperature of the heated gas introduced into each upper moving layer portion through the gas pipe or elevating or lowering it by a heat exchanger provided in each gas pipe, whereby the heat-treating temperatures for the particles in the individual moving layer portions are maintained at the same point or predetermined different points.

According to this invention, there is also provided an apparatus for heat-treating particles including a contacting receptacle for contacting downwardly moving particles with an upwardly moving heated gas and a hopper for supplying the particles to the top portion of the contacting receptacle, said apparatus further comprising (1) a particle supply pipe in the upper end portion of the contacting receptacle communicating with the hopper and having means for controlling the supply of the particles, (2) a gas withdrawing pipe at the upper end portion of the contacting receptacle for withdrawing the heated gas which has contacted the particles from the contacting receptacle, (3) a plurality of moving layer portions each consisting of a particle moving layer and a gas layer above it, said moving layer portions being formed by partitioning the contacting receptacle with a plurality of funnel-shaped supporting plates having a cone portion and a leg pipe and each moving layer portion being located over each funnel-shaped supporting plate, (4) a gas holding chamber disposed between the lowermost funnel-shaped supporting plate and the bottom portion of the contacting receptacle, (5) one or a plurality of porous antiblocking plates formed of a crosspiece having a triangular sectional shape with an acute vertical angle, said antiblocking plate or plates being disposed in the particle moving layer of each moving layer portion with the vertical angle of each plate being directed upwardly, (6) an umbrella-shaped gas dispersing plate provided centrally in the lower surface of the lowermost antiblocking plate in each of the moving layer portions except the lowermost moving layer portion, the flared portion of said gas dispersing plate being directed downwardly, (7) a gas pipe including a heat exchanger and leading from the lower portion of each gas dispersing plate to the gas layer of the adjoining lower moving layer portion, (8) a heated gas supplying pipe connected to the bottom portion of the contacting receptacle for supplying the heated gas to said gas holding chamber, (9) a particle withdrawing pipe connected to the bottom portion of the contacting receptacle and having means for controlling discharging of the particles from the contacting receptacle; and

(10) at least one nozzle disposed in the lowermost funnel-shaped supporting plate for blowing the heated gas from the gas holding chamber into the particle moving layer of the lowermost moving layer portion.

BRIEF DESCRIPTION OF THE DRAWINGS

FIG. 1-*a* is a longitudinal sectional view of the apparatus of this invention for heat-treating particles;

FIG. 1-*b* is a sectional view taken along line A—A of FIG. 1-*a*;

FIG. 2-*a* is a top plan view of a ring-like antiblocking plate;

FIG. 2-*b* is a sectional view taken along line B—B of FIG. 2-*a*;

FIG. 2-*c* is a sectional view taken along line B'—B' of FIG. 2-*a*;

FIG. 3-*a* is a top plan view of a lattice-like antiblocking plate;

FIG. 3-*b* is a sectional view taken along line C—C of FIG. 2-*a*;

FIG. 4-*a* is a perspective view of an umbrella-shaped gas dispersing plate; and FIG. 4-*b* is a sectional view of a gas dispersing plate secured to the lower surface of an antiblocking plate.

DETAILED DESCRIPTION OF THE INVENTION

The invention will now be described in detail with reference to the accompanying drawings.

One embodiment of the apparatus of this invention which is conveniently used to work the method of this invention is shown in FIG. 1. FIG. 1-*a* is a longitudinal sectional view of the apparatus, and FIG. 1-*b* is its sectional view taken along line A—A of FIG. 1-*a*.

As shown in FIG. 1-*a*, a cylindrical contacting receptacle 1 (with an inside diameter D) is partitioned by providing therein a plurality of funnel-shaped supporting plates 5, 5' and 5", and consequently, a multiplicity of moving layer portions 6, 6' and 6" are formed within the contacting receptacle 1. Each of the funnel-shaped supporting plates consists of a cone portion and a leg pipe (inside diameter $D_1$, length $L_1$) connected to the lower part of the cone portion. The inside diameter $D_1$ of the leg pipe is considerably smaller than the inside diameter D of the contacting receptacle. In the specific embodiment shown in FIG. 1-*a*, the container receptacle 1 is partitioned by three funnel-shaped supporting plates to form three moving layer portions. Generally, at least two funnel-shaped supporting plates are required. The number of such funnel-shaped supporting plates is preferably 2 to 6, more preferably 3 or 4. Thus, a multiplicity (corresponding to the number of the funnel-shaped supporting plates) of moving layer portions are provided within the contacting receptacle 1.

A hopper 2 for supplying particles to be heat-treated to the upper portion of the contacting receptacle 1 is set up above the contacting receptacle 1. A particle supply pipe 3 communicating with the hopper 2 is connected to the upper portion of the contacting receptacle 1. The particle supply pipe 3 includes means for controlling the supply of particles which may, for example, be a valve 4 such as a lock or rotary valve.

The particles supplied to the contacting receptacle 1 form particle accumulated layers 7, 7' and 7" supported by the funnel-shaped supporting plates 5, 5' and 5" respectively in the individual moving layer portions 6, 6' and 6", and some of them incessantly move downwardly from the leg pipes of the funnel-shaped supporting plates 5, 5' and 5". Accordingly, the particle accumulated layers are moving layers where the particles always move downwardly. In the present specification and claims, therefore, the particle accumulated layers are referred to as moving layers 7, 7' and 7". In the areas partitioned by the funnel-shaped supporting plates (i.e., the moving layer portions), the spaces above the particle moving layers 7, 7' and 7" are gas layers 8, 8' and 8". In other words, each of the moving layer portions 6, 6' and 6" consists of each of the moving layers 7, 7' and 7" and each of the gas layers 8, 8' and 8", respectively.

Antiblocking plates 9, 9' and 9" composed of porous plates are disposed respectively in the particle moving layers 7, 7' and 7" in the individual moving layer portions. Thus, during downward movement in the moving layers, the particles pass through the pores of the porous plates and are prevented from agglomeration. The antiblocking plates also serve to promote dispersion of the heated gas and make the heating of the particles uniform. Each of the antiblocking plates is a porous plate made up of a crosspiece having a triangular cross section with an acute vertical angle. For example, it may be a ring-like porous plate as shown in FIG. 2, or a lattice-like porous plate as shown in FIG. 3. In each of the particle moving layers, one or a plurality of such porous plates are arranged such that the vertical angle of each triangular crosspiece is directed upwardly. This arrangement permits easy movement of the particles in the moving layer. In the embodiment shown in FIG. 1-*a*, three antiblocking plates are disposed in all of the moving layer portions, but the number the antiblocking plates need not to be the same throughout the moving layer portions.

A heated gas is supplied from a heated gas supply pipe 10 communicating with the bottom portion of the contacting receptacle 1 to a heated gas holding chamber 11 from where it is jetted into the moving layer 7" of the lowermost moving layer portion 6" through a nozzle 12 disposed in the cone portion of the lowermost funnel-shaped supporting plate 5" in the contacting receptacle 1. The gas holding chamber 11 is set up in the space between the lowermost funnel-shaped supporting plate 5" and the bottom portion of the contacting receptacle 1, and serves to prevent rapid cooling of the particles in the lowermost moving layer portion 6". The number of nozzles 12 for jetting the heated gas may be one, but desirabley at least 2 and preferably 4 to 8. Preferably, the nozzles 12 are arranged on the same circumference of the cone portion of the funnel-shaped supporting plate 5". In the apparatus shown in FIG. 1, four nozzles 12 are disposed on the same circumference of the cone portion as shown in FIG. 1-*b*.

The heated gas which has been introduced into the lowermost moving layer portion 6" and contacted the particles in the moving layer 7" is then introduced into the moving layer portion 6' immediately above the moving layer 7" through a gas pipe 13' and contacts the particles in the moving layer 7'. The gas pipe 13' extends from the gas layer 8" of the lowermost moving layer portion 6", is inserted into the moving layer 6' at a position immediately above the upper end of the cone portion of the funnel-shaped supporting plate 5', and thence reaches the lower portion of an umbrella-like gas dispersing plate 14' which is secured, with its flared portion directed downwardly as shown in FIG. 4, to the undersurface of the lowermost one of the antiblocking plates 9' disposed in the moving layer 7'. By dint of this construction, the heated gas which has been introduced into the moving layer of an upper moving layer portion from the gas layer of a lower moving layer portion can heat the particles in the moving layer uniformly without causing the channeling phenomenon in which the gas flows locally within he moving layer.

The gas pipe 13' is equipped with a heat-exchanger 15'. If desired, the heated gas passing through the gas pipe 13' may be introduced into the moving layer 7' after its temperature is elevated or lowered. As a result, the heat-treatment temperature for the particles in the lowermost moving layer portion 6" and the heat-treatment temperature for the particles in the upper moving layer portion 6' may be prescribed at different predetermined points.

In order to prevent the decrease of the oxygen concentration of the heated gas by burning and to effect the burning reaction at a predetermined temperature, a fresh heated gas may be supplied from a heated gas replenishing pipe 16' as required.

The heated gas which has contacted the particles in the moving layer 7' of the moving layer portion 6' further contacts the particles in the moving layer 7 of the upper moving layer portion 6 by repeating the same process as described above. The moving layer portion 6 has provided therein an umbrella-shaped gas dispersing plate 14 of the same structure and arrangement as above, a gas pipe 13 communicating between a part below the dispersing plate 14 and the gas layer 8' of the moving layer portion 6', and a heat-exchanger 15 and a heated gas replenishing pipe 16 which are attached to the gas pipe 13. FIG. 1-a shows the apparatus having three moving layer poritons. When more than three moving layer portions exist, the heat-treatment of the particles in the individual moving layer portions can be carried out in the same way as described above.

The heated gas which has contacted the particles in the uppermost moving layer portion 6 is discharged out of the contacting receptacle 1 from a heated gas withdrawing pipe 17 provided in the upper end portion of the contacting receptacle. In the meantime, the particles which have contacted the heated gas at the lowermost moving layer portion 6" are withdrawn from the particle withdrawing pipe 18 connected to the bottom portion of the contacting receptacle 1. At this time, the leg pipe of the lowermost funnel-shaped supporting plate 5" may be used as the particle withdrawing pipe. Or the particle withdrawing pipe 18 is connected to the leg pipe and means for controlling discharging of the particles, for example a valve such as a rotary valve 19 and a lock valve 20, are provided at the pipe 18. In this manner, the particles which have been heat-treated as above are discharged out of the contacting receptacle 1 at a predetermined speed.

At the start of performing the method of this invention, such operations as the supplying and discharging of the particles and the heated gas are performed as described below.

The particles are supplied to the hopper 2 while the valve 4 such as a lock or rotary valve provided in the particle supply pipe 3 is kept closed or out of motion. While the heated gas is being supplied from the heated gas supply pipe 10 at the bottom portion of the contacting receptacle 1, the rotary valve 19 and the lock valve 20 provided in the particle withdrawing pipe 19 at the bottom portion of the contacting receptacle 1 are kept out of motion or closed. Thereafter, by maintaining a lock valve provided in the particle supply pipe 3 at a suitable degree of opening or rotating a rotary valve at a suitable rotating speed, the particles are supplied to the contacting receptacle 1 from the hopper 2 to form particle moving layers in the individual moving layer portions. If desired, the particles may be fed from the hopper 2 after they have been pre-heated to a suitable temperature.

The particles of the moving layer formed in the contacting receptacle 1 are withdrawn from the particle withdrawing pipe 18 at a predetermined speed by opening the lock valve 20 provided at the particle withdrawing pipe 18 and maintaining the rotary valve 19 at a fixed rotating speed. At this time, the valve 4 in the particle supplying pipe 3 is maintained open, and the particles are continuously supplied from the hopper 2.

By the balance between the supply of the particles to the individual moving layer portions in the contacting receptacle 1 and the supply of the heated gas, a certain fixed pressure balance is generated within the contacting receptacle 1. As a result, the gas layers 8, 8' and 8" are formed respectively in the upper sections of the moving layer portions 6, 6' and 6", and the particle moving layers 7, 7' and 7" of a certain height are formed in the lower sections of the moving layer portions. The particles can move in good condition through the contacting receptacle.

The method of this invention may be performed continuously as stated above, or by a batchwise procedure in which the particle withdrawing valve at the bottom of the contacting receptacle 1 is closed for a predetermined period of time, and after the completion of the heat-treatment, the valve is opened and the particles are moved to the next moving layer portion below.

Desirably, the shape of the contacting receptacle used in this invention satisfies the following condition $$2 < H/D < 15$$

preferably $$3 < H/D < 10$$

wherein D is the inside diameter of the contacting receptacle and H is the height.

The angle $\theta_1$ of the cone portion of each funnel-shaped supporting plate used in this invention is desirably $20° < \theta_1 < 80°$, preferably $30° < \theta_1 < 60°$, with respect to the horizontal line.

The length $L_1$ of the leg pipe connected to the lower end of the cone portion is preferably such that its lower end is located below the upper end level of the particles in the moving layer, which level is determined by the operating conditions. Thus, the leg pipe is always embedded in the particle layer.

The section of the crosspiece which constitutes the antiblocking plate (porous plate) used in this invention is triangular, and its vertical angle is acute. Generally, this vertical angle $\theta_2$ is desirably $10° < \theta_2 < 60°$, preferably $30° < \theta_2 < 45°$.

The opening size $d_2$ of the antiblocking plate may be 5 to 100 times, preferably 20 to 50 times, the average diameter $D_p$ of the particles, and 5 to 100 times, preferably 10 to 50 times, the width $d_1$ of each crosspiece of the antiblocking plate.

Antiblocking plates in the required number are provided so that the ratio of the height $H_3$ from the lowermost one of the antiblocking plates disposed within a given moving layer to the upper end of the moving layer to the average diameter $D_p$ of the particles desirably satisfies the condition $5 < H_3/D_p < 100$, preferably $8 < H_3/D_p < 60$.

The gas dispersing plate used in this invention is an umbrella-shaped dispersing plate having a certain vertical angle $\theta_3$ as shown in FIG. 4-a. The umbrella-shaped gas dispersing plate is secured centrally to the undersurface of the lowermost one of the antiblocking plates with its flared side being directed downwardly as shown in FIG. 4-a.

The vertical angle $\theta_3$ of the umbrella-shaped dispersing plate is desirably $20° < \theta_3 < 80°$, preferably $30° < \theta_3 < 60°$.

The antiblocking plates and the gas dispersing plates should have strength sufficient to withstand the weight of the moving layer (the static pressure of the contacting receptacle as it has been filled with particles).

The particles which can be used in this invention varies greatly in property and shape, and include particles of all shapes such as spherical particles and extrusion-molded particles having a particle size of 0.1 to 10 mm, desirably a particle diameter of not more than 6 mm.

Preferably, the particles have a true specific gravity of 1.20 to 7.00, and an apparent specific gravity of 0.10 to 1.50.

Examples of the particles which can be used in this invention include used catalyst particles and used adsorbent particles. The used catalyst particles are, for example, those composed of a carrier such as alumina, silica, mordenite, zirconia, diatomaceous earth and other refractory inorganic materials and metals of Groups VI, VII and VIII supported thereon. The surfaces or pores of these particles contain oils, carbon particles, sulfur and metals such as nickel and vanadium adhering or adsorbed thereto. The used adsorbents are, for example, silica gel, active alumina, molecular sieves and other inorganic materials which contain water, volatile substances, etc. adsorbed onto their surfaces or pores.

The heated gas which can be used in this invention may, for example, be nitrogen, air, or a mixture of oxygen and nitrogen which is heated to a predetermined temperature, boiler exhaust gases, and exhaust gases from a catalyst regenerating column of a catalytic cracking apparatus in the petroleum refining industry.

The method of this invention is desirably carried out under the operating conditions represented by the following inequality $$U_g < U_{mf}$$

wherein $U_g$ is the superficial gas velocity (based on an empty column) of the heated gas in each moving layer portion, and $U_{mf}$ is the minimum fluidization velocity determined by the specific gravity and viscosity of the heated gas (i.e., the minimum velocity at which the particles form a fluidized layer in a column).

The temperatures of the individual moving layer portions in the apparatus of this invention are controlled in the manner to be described below.

When, for example, used catalyst particles are to be treated by using a contacting receptacle having three moving layer portions, the upper, middle and lower moving layer portions are controlled to different temperatures, for example as described below.

(1) Desirably, the temperature of the upper moving layer portion is adjusted to 250° to 350° C., preferably 270° to 320° C. (with an accuracy of ±3° C.).
(2) The temperature of the middle moving layer portion is adjusted desirably to 350° to 450° C., preferably 370° to 430° C. (with an accuracy of ±3° C.).
(3) The temperature of the lower moving layer portion is adjusted desirably to 450° to 550° C., preferably 470° to 530° C. (with an accuracy of ±3° C.).

Another method of heat-treatment involves adjusting the temperatures of the upper, middle and lower moving layer portions to a certain fixed range, and recyclically supplying the used catalyst particles to the contacting receptacle. The accuracy of temperature control in this case is the same as described above, and the particles are successively treated in the individual moving layer portions.

It is also possible to change the temperature controls in the moving layers, and maintain the upper moving layer portion at a higher temperature and the lower moving layer portion at a lower temperature during the heat-treatment of the used catalyst particles.

A used adsorbent may be regenerated and recovered by using the apparatus of this invention including a contacting receptacle having three moving layer portions. In the same way as in the treatment of the used catalyst particles, the upper, middle and lower moving layer portions may be controlled to different temperatures as shown below.

(1) The temperature of the upper moving layer portion is adjusted desirably to 105° to 150° C., preferably 110° to 130° C. (with an accuracy of ±3° C.).
(2) The temperature of the middle moving layer portion is adjusted desirably to 150° to 200° C., preferably 160° to 180° C. (with an accuracy of ±3° C.).
(3) The temperature of the lower moving layer portion is adjusted desirably to 200° to 260° C., preferably 210° to 240° C. (with an accuracy of ±3° C.).

Another method of heat-treatment involves adjusting the temperatures of the upper, middle and lower moving layer portions to a certain fixed range, and recyclically supplying the used adsorbent to the contacting receptacle. The accuracy of temperature control in this case is the same as described above, and the particles are successively treated in the individual moving layer portions.

Since a cooling treatment must be carried out sufficiently in regenerating and recovering the adsorbent, it is advisable to use a part of each moving layer as a cooling section.

The characteristic features of the invention and the advantages obtained thereby are summarized below.

(1) By providing antiblocking plates and gas dispersing plates of special structures in a plurality of moving layer portions resulting from partitioning a contacting receptacle with funnel-shaped supporting plates, particle moving layers in the individual moving layer portions move without hindrance and blocking of the particles can be prevented. Moreover, channeling of the heated gas can be prevented, and the heated gas can be dispersed uniformly in the moving layer.
(2) A difference may be set up in the moving speeds of the particles by the difference between the cross-sectional area of the contacting receptacle and the moving speed of the particles. This is effective for preventing block-up of the moving layer.
(3) Since the special gas dispersing plate can be made of a metal having a higher heat conductivity than the particles to be heat-treated, it is possible to increase the heat conducting efficiency within the moving layer and perform uniform heating.
(4) By controlling the temperatures of the moving layer portions to different values in each of the moving layer portions within the contacting receptacle, the heat-treatment can be carried out at different burning speeds (reaction speeds, drying speeds, etc.). In other words, a plurality of burning steps (reaction steps or drying steps) can be carried out within the same contacting receptacle. The contacting receptacle can therefore be effectively utilized, and by utilizing the difference in moving speed described in section (2) above, the particles can be rapidly sent to a different step.

(5) Because of the characteristic feature mentioned in (4) above, the amount of the heated gas can be markedly decreased from that required in a conventional apparatus of the same type.

The following Examples illustrate the present invention more specifically.

EXAMPLE 1

An experiment was carried out to observe the movement of particles under the conditions shown in Table 1 using the same apparatus as shown in FIG. 1 including the antiblocking plates shown in FIG. 2 and the gas dispersing plates shown in FIG. 4.

TABLE 1

| Dimension of the contacting receptacle | Height 200 cm, diameter 20 cm |
|---|---|
| Particles | Used catalyst particles composed o a silica-alumina carrier and Co—Mo type catalyst particles supported thereon and having 10% by weight of carbon particles adhering or adsorbed to the surfaces or pores of the catalyst particles; average particle diameter (equivalent diameter based on volume), 2.7 mm; true specific gravity 3.1. |
| Moving layer portion | Three moving layer portions of the same configuration; the angle ($\theta_1$) of the cone portion in the lower portion of each moving layer = 45°; the dimension of the leg pipe in the lower portion of the moving layer, 20 cm in length and 4 cm in inside diameter. |
| Antiblocking plate | Vertical angle ($\theta_2$) = 40°; two antiblocking plates per moving layer. |
| Gas dispersing plate | Vertical angle of the umbrella-shaped gas dispersing plate ($\theta_3$): 45° |

In this experiment, the heated gas (air) was maintained at 50° C., and the movement of the particles in each of the moving layer portions was observed by adjusting the flow rate of the heated gas to 10 liters/min. (0.53 cm/sec), 500 liters/min. (26.5 cm/sec), and 1,000 liters/min. (53.0 cm/sec) (the parenthesized figures show the superficial gas velocities based an empty column).

The particles were moved by controlling the rotary valve under the above conditions. The upper end level of each of the moving layer was maintained constant, and no variation in moving velocity owing to local block-up of the particles was observed. The particles could be moved quite smoothly.

Similar results were obtained when the above procedure was repeated by using the antiblocking plates shown in FIG. 3 instead of the antiblocking plates shown in FIG. 2.

EXAMPLE 2

A burning experiment was carried out to remove 10% by weight of carbon adhering or adsorbed to the same catalyst particles as shown in Table 1 using the same contacting receptacle as indicated in Table 1. The exprimental conditions are shown in Table 2.

TABLE 2

| Heated gas | $O_2 + N_2$ ($O_2$: 1 vol. %) |
|---|---|
| Flow rate of the heated gas | 746 liters/min. (superficial gas velocity based on an empty column: 39.5 cm/sec) |
| Moving speed of the particles (the velocity in the moving layer portion except the cone portion) | 9.5 cm/hr |
| Temperature | |
| Upper moving layer | 300 ± 3° C. |
| Middle moving layer | 400 ± 3° C. |
| Lower moving layer | 450 ± 3° C. |
| Treating time | 14 hours |

The above experiment was carried out in very good condition. The amount of carbon adhering to the catalyst particles at the start of the experiment (i.e., 10% by weight) decreased to 0.02% by weight after the treatment. This gave a carbon removal ratio of 99.8%.

EXAMPLE 3

A burning experiment was carried out under the conditions shown in Table 3 using the same apparatus as used in FIG. 1 including the antiblocking plates shown in FIG. 2 and the gas dispersing plates shown in FIG. 4.

TABLE 3

| Contacting receptacle | Height 400 cm, diameter 30 cm |
|---|---|
| Particles | Used catalyst particles composed of a silica-alumina carrier and Co—Mo type catalyst particles and containing 14.5% by weight of carbon particles adhering or adsorbed to the surfaces or pores of the catalyst particles; average particle diameter (equivalent diameter based on volume) 2.68 mm; true specific gravity 3.1. |
| Moving layer portion | Three moving layer portions of the same configuration; the angle $\theta_1$ of the cone portion of the moving layer portion = 45°; the dimension of the leg pipe in the lower part of the moving layer portion = 20 cm in length and 4 cm in inside diameter. |
| Antiblocking plate | Five antiblocking plates in each moving layer; the vertical angle $\theta_2$ of each plate = 35° |
| Umbrella-shaped gas dispersing plate | Vertical angle $\theta_3$: 50° |
| Heated gas | $O_2 + N_2$ ($O_2$: 1.5 vol. %) |
| Flow rate of the heated gas | 3,300 liters/min. (superficial gas velocity based on an empty column: 78.0 cm/sec) |
| Moving velocity of the particles (at the moving layer portion excepting the cone portion) | 15.6 cm/hr |
| Temperature | |
| Upper moving layer | 300 ± 3° C. |
| Middle moving layer | 400 ± 3° C. |
| Lower moving layer | 500 ± 3° C. |

TABLE 3-continued

| Contacting receptacle | Height 400 cm, diameter 30 cm |
|---|---|
| Treating time | 16 hours |

The above experiment was carried out very well. The amount of carbon initially adhering to the catalyst particles (i.e., 14.5% by weight) decreased to 0.04% by weight by the treatment. This gave a carbon removal ratio of 99.7%.

Similar results were obtained when the above experiment was carried out using the antiblocking plates shown in FIG. 3 instead of the antiblocking plates shown in FIG. 2.

EXAMPLE 4

An experiment of drying an adsobent (silica gel) was carried out under the conditions shown in Table 4 using the same apparatus as shown in FIG. 1 including the antiblocking plates shown in FIG. 2 and the gas dispersing plates shown in FIG. 4.

TABLE 4

| Contacting receptacle | Height = 200 cm, diameter = 20 cm |
|---|---|
| Particles | Spherical silica gel having a water content of 0.36 kg per kg of silica gel; average particle diameter = 4 mm; true specific gravity = 2.2. |
| Moving layer portion | Two moving layer portions of the same configuration; the angle $\theta_1$ of the moving layer portion = 45° C.; the dimension of the leg pipe at the lower part of the moving layer portion, 40 cm in length and 4 cm in inside diameter |
| Antiblocking plate | Two antiblocking plates in each moving layer; the vertical angle $\theta_2 = 35°$ |
| Umbrella-shaped gas dispersing plate | Vertical angle $\theta_3 = 50°$ |
| Drying gas | Air |
| Moving velocity of particles (at the moving layer portion excepting the cone portion) | 0.0019 cm/sec |
| Treating time | 12 hours |

Air having a temperature of 30° C. and a relative humidity of 0.01 (kg H$_2$O/dry air) was supplied at a rate of 40 m$^3$/hour to the lower moving layer of the contacting receptacle, and air having a temperature of 200° C. and a relative humidity of 0.01 (kg H$_2$O/dry air) was supplied at a rate of 198 m$^3$/hour to the upper moving layer portion. While the temperature of the air at the exit was adjusted to 120° C., the water content of silica gel was decreased to 0.14 (kg H$_2$O/kg silica gel).

The relative humidity of the air at the exit of the contacting receptacle became 0.039 (kg H$_2$O/dry air). This shows that the silica gel could be fully regenerated.

Similar results were obtained by carrying out the above experiment using the antiblocking plates shown in FIG. 3 instead of the antiblocking plates shown in FIG. 2.

What is claimed is:

1. A method of heat-treating particles selected from the group consisting of used catalysts and used adsorbents by contacting within a contacting receptacle particles fed from the top portion of the receptacle with a heated gas introduced from its bottom portion, which comprises (1) moving the particles sequentially from an upper to a lower moving layer portion through a multiplicity of moving layer portions formed by partitioning said contacting receptacle with a plurality of funnel-shaped supporting plates, said movement being effected via porous plates provided in the individual moving layer portions to thereby prevent blocking of the particles, (2) meanwhile causing the heated gas to rise sequentially from the lowermost moving layer portion to upper moving layers to contact it with the particles in each of the moving layer portions, the heated gas being supplied through a gas pipe leading from the gas layer of each moving layer portion to an umbrella-shaped gas dispersing plate provided in the adjoining upper moving layer portion to disperse the heated gas introduced in each adjoining upper moving layer, and (3) maintaining the temperature of the heated gas introduced into each upper moving layer portion through the gas pipe or elevating or lowering it by a heat exchanger provided in each gas pipe, whereby the heat-treating temperatures for particles in the individual moving layer portions are maintained at the same point or predetermined different points, said used catalysts being heat treated at 250° to 550° C. and said used adsorbents being heat treated at 105° to 260° C.

2. The method of claim 1 wherein the particles have a particle diameter of 0.1 to 10 mm.

3. The method of claim 1 wherein the heat-treatment temperatures for the particles in the individual moving layer portions are maintained at predetermined different points.

4. The method of claim 1 wherein the heat-treatment temperatures for the particles in the individual moving layer portions are substantially the same.

5. The method of claim 1 wherein the number of the moving layer portions is from 2 to 6.

6. An apparatus for heat-treating particles including a contacting receptacle for contacting downwardly moving particles with an upwardly moving heated gas and a hopper for supplying the particles to the top portion of the contacting receptacle, said apparatus further comprising (1) a particle supply pipe in the upper end portion of the contacting receptacle communicating with the hopper and having means for controlling the supply of the particles, (2) a gas withdrawing pipe at the upper end portion of the contacting receptacle for withdrawing the heated gas which has contacted the particles from the contacting receptacle, (3) a plurality of moving layer portions each consisting of a particle moving layer and a gas layer above it, said moving layer portions being formed by partitioning the contacting receptacle with a plurality of funnel-shaped supporting plates having a cone portion and a leg pipe and each moving layer portion being located over each funnel-shaped supporting plate, (4) a gas holding chamber disposed between the lowermost funnel-shaped supporting plate and the bottom portion of the contacting receptacle, (5) one or a plurality of porous antiblocking plates formed of a crosspiece having a triangular sectional shape with an acute vertical angle, said antiblocking plate or plates being disposed in the particle moving layer of each moving layer portion with the vertical angle of each plate being directed upwardly, (6) an umbrella-shaped gas dispersing plate provided centrally in the lower surface of the lowermost antiblocking plate in each of the moving layer portions except the lowermost moving layer portion, the flared portion of said gas dispersing plate being directed downwardly, (7) a gas pipe including a heat exchanger and leading from the lower portion of each gas dispersing plate to the gas layer of the adjoining lower moving layer portion, (8) a heated gas supplying pipe connected to the bottom portion of the contacting receptacle for supplying the heated gas to said gas holding chamber, (9) a particle withdrawing pipe connected to the bottom portion of the contacting receptacle and having means for controlling discharging of the particles from the contacting receptacle, and

(10) at least one nozzle disposed in the lowermost funnel-shaped supporting plate for blowing the heated gas from the gas holding chamber into the particle moving layer of the lowermost moving layer portion.

7. The apparatus of claim 6 wherein the number of the funnel-shaped supporting plates is 2 to 6.

8. The apparatus of claim 6 wherein the inclination angle ($\theta_1$) of the cone portion of the funnel-shaped supportting plate to the horizontal line is $20° < \theta_1 < 80°$.

9. The apparatus of claim 6 wherein the vertical angle ($\theta_2$) of the triangular section of the crosspiece is $10° < \theta_2 < 60°$.

10. The apparatus of claim 6 wherein the vertical angle ($\theta_3$) of the umbrella-shaped dispersing plate is $20° < \theta_3 < 80°$.

* * * * *